United States Patent [19]

Von Braunhut

[11] Patent Number: 4,974,953
[45] Date of Patent: Dec. 4, 1990

[54] OPTICAL TOY DEVICE AND METHOD OF MANUFACTURING THEREOF

[76] Inventor: Harold Von Braunhut, P.O. Box 809, Bryans Rd., Md. 20616

[21] Appl. No.: 340,233

[22] Filed: Apr. 19, 1989

[51] Int. Cl.$^5$ ............................. G02C 7/16; A63J 3/00
[52] U.S. Cl. ........................................ 351/45; 351/46; 272/8 R; 272/8 N
[58] Field of Search ........................ 351/41, 44, 45, 49, 351/51, 178, 46, 158; 222/8 R, 8 N; 350/162.18

[56] References Cited

U.S. PATENT DOCUMENTS

| | | | |
|---|---|---|---|
| 839,016 | 12/1906 | MacDonald | 350/162.18 |
| 3,592,533 | 7/1971 | Von Braunhut | 351/46 |
| 3,711,183 | 1/1973 | Von Braunhut | 350/162.18 |

OTHER PUBLICATIONS

"X-Ray Spex" advertisement, Honey Toy Industries, Inc. 3/10/66.

Primary Examiner—Rodney B. Bovernick
Attorney, Agent, or Firm—Helfgott & Karas

[57] ABSTRACT

In an optical toy device and a method of manufacturing the same, a frame for eyeglasses is cutout of a blank which is provided with two pairs of holes aligned with each other and is coated with a vinyl material on a side thereof. Adhesive is applied to the reverse side of the blank, and two feathers are attached to its reverse side to overlap two holes on one half of the blank and form with the holes eyepiece lenses. The blank is folded at its backside together so that its halves are glued to each other. The frame having two eyepiece lenses are formed thereby. A temple bar folded to form thereon two hinges is heat-sealed to the frame. The feathers are attached to the frame in such fashion that the barbs of the feather overlapping one hole for one eyepiece are angularly oriented with the barbs of the feather overlapping another hole for the other eyepiece to produce an X-ray image of an object to be viewed.

16 Claims, 4 Drawing Sheets

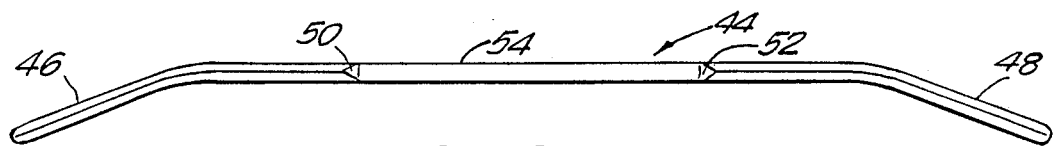
FIG. 6
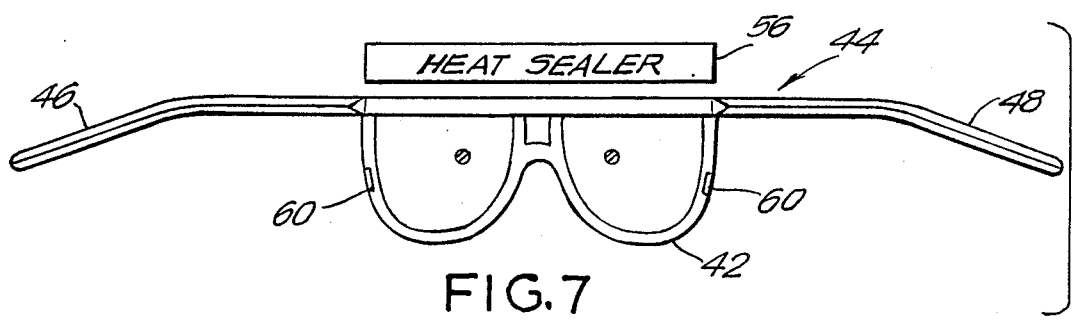
FIG. 7
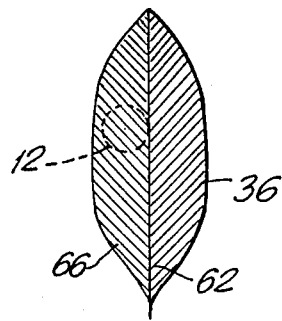      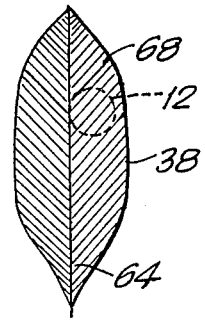
FIG. 8a                FIG. 8b

OPTICAL TOY DEVICE AND METHOD OF MANUFACTURING THEREOF

BACKGROUND OF THE INVENTION

The present invention generally relates to toy devices for producing optical illusions such as simulating visual effects, for example, X-ray images, and more particularly to eyeglasses capable of simulating X-ray images.

Eyepieces of the foregoing type have been used as X-ray simulating toys. In one of known constructions the eyepieces include a light strainer to be interspersed between a pair of opaque lenses. In another construction of an X-ray simulating toy, at least one of the lenses made of stressed transparent material is transparent and its plane of stress is disposed in a substantially horizontal relationship with the plane of stress of the other lens to simulate an X-ray image when an object to be viewed is in a vertical position.

It has also been known to use a feather as a light straining member in X-ray simulating toys. A feather can be placed between a pair of transparent layers so that the light is deflected which produces a coherent area of a non-uniform transparency whereby brighter portions are interrupted by narrow darker lines.

Applicant's U.S. Pat. No. 3,711,183 discloses an optical toy device comprising an eyeglass frame with a pair of eyepieces each having a lens opening accommodating a lens. Each lens is made of thermoplastic material such as polystyrene or the like and has a plurality of grooves which extend in a predetermined orientation relative to each other. When an object is viewed through the eyeglasses an X-ray image of the object is simulated. The grooves extend generally in a parallel array and in contiguous relationship. Although grooves in the lenses are formed generally in a mold, a diamond tip tool for accurately forming the grooves in the mold has been typically required, which made manufacturing of such grooves rather expensive.

Accordingly, there has always been need to make the production of such toys less expensive.

SUMMARY OF THE INVENTION

It is therefore an object of the present invention to provide X-ray simulating eyepieces which are easy and inexpensive to produce.

It is another object of the present invention to provide a method of manufacturing X-ray simulating eyepieces, which is simple and can be fully automated.

In brief, there is provided an optical toy device in the form of eyepieces. The toy device comprises a frame and a temple bar attached to the frame. The frame has two eyepieces each having a hole which is overlapped at a non-visible side of the frame with a transparent feather. Each feather forms with the respective hole an eyepiece lens. The two feathers are attached to the frame so that the splines or barbs of the feather overlapping one hole are angularly oriented with the barbs or splines of the feather overlapping another hole so as to produce for the user an orthogonal effect resulting in a simulated X-ray image of an object to be viewed when two eyepiece lenses are binocularly combined.

In an embodiment, the front and back sides of the frame are coated with vinyl coating.

In an embodiment, the frame is cut of cardboard material.

In an embodiment, the temple bar is made of PVC material.

There is also provided a method of manufacturing an optical toy device, in which a blank for a frame for eyepieces is made, on the lower part of front side of which a printed information is provided. Two sets of mutually aligned holes are provided in the blank. The unprinted, uncoated backside of the blank is covered with glue at predetermined locations. Together with the printing, as part of the same process, the front is coated with a vinyl coating to provide a PVC compatible sealing surface, a smooth finish and protect the printed designs and printed information. Two feathers are glued to its non-vinyl coated backside so as to overlap two holes to form therewith eyepiece lenses. The feathers are mutually oriented on the blank in such fashion that the barbs of the feather overlapping one of the two holes are angularly oriented with the barbs of the feather overlapping another of the two holes. The blank is then folded together so that its unprinted surfaces face each other and are glued to each other. A temple bar, which is folded to increase its stiffness, and creased to provide living hinges thereon, is heat-sealed to the resulting frame of the eyepieces to complete the toy device. The print protecting vinyl coating is thereby simultaneously used as an adhesive heat sealing material. The above described orientation of the feathers would produce an orthogonal effect that would cause a realistic, simulated X-ray image of an object to be viewed when the eyepieces are in use.

The aforementioned objects, features and advantages of the invention will, in part, be pointed out with particularity, and will, in part, become obvious from the following more detailed description of the invention, taken in conjunction with the accompanying drawing, which form an integral part thereof.

BRIEF DESCRIPTION OF THE DRAWINGS

In the drawings:

FIG. 6 shows the temple bar with the stiffened bends;

FIG. 7 illustrates the step of sealing the temple bar to the vinyl-coated surface of the frame; and FIGS. 8a, 8b, 9a, 9b, 10a and 10b show variations of the orthogonal orientation for polarization effect.

In the various figures of the drawings like reference characters designate like parts.

DETAILED DESCRIPTION OF THE PREFERRED EMBODIMENTS

Figure 1:
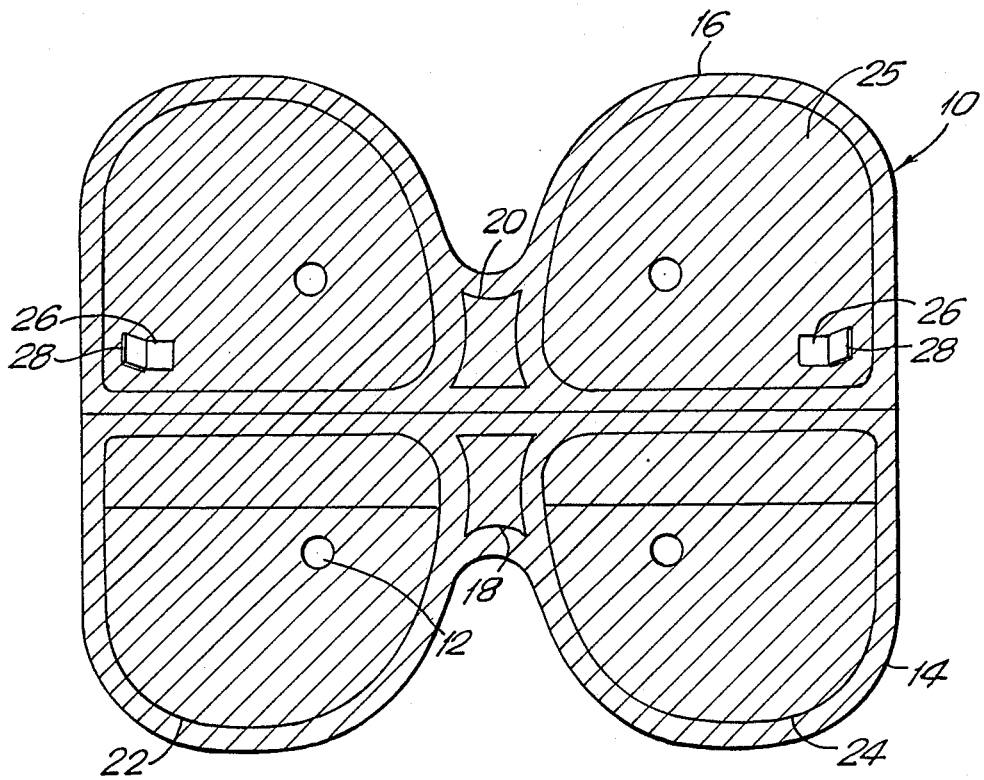
FIG. 1 is a front view of a cardboard blank for producing eyeglasses according to the invention.

Referring now to the drawings in detail, FIG. 1 shows the front face of a blank 10 made of cardboard. Holes 12 at locations predetermined for viewing through the eyeglasses are cut out in blank 10. Blank 10 of cardboard includes a lower half 14 and an upper half 16 each having the configuration of a typical eyeglass frame. Designs 18 and 20 are printed on blank 10 to make it appear more as glasses. Information indicating that the eyeglasses are intended for X-ray vision is preprinted on the lower half 14 of the front side of the blank. Two eyepieces 22 and 24 are also printed on the face of each half 14, 16 of the blank.

Blanks 10 can be easily cutout by punching a series of superposed cardboard plates by means of any suitable punch tool. Holes 12 as well as cut-outs 18, 20 may be punched out during or after the cutout step in which the blanks 10 are shaped by the same or a different punch tool.

Image is printed on full press sheet or suitable cardboard stock, and coated. After drying, the blanks are diecut on the sheet and stripped out to remove unwanted material from around the periphery and the viewing holes.

A vinyl coating designated at 25 is applied during normal ink-coating process on the printing press over the entire area of the front side of blank 10 having the image thereon. The coating may be, for example, the 9762-Pierce and Steven coating. The vinyl coating provides a glossy appearance of the frame and protects the words printed on the frame.

As further seen in FIG. 1, two substantially rectangular cutouts 26 are formed at two sides of the upper half 16 of blank 10 and in spaced relationship from the lateral edges of the blank so that the cardboard material left from the cutouts is not removed but bent outwards so as to form two outwardly protruding and rather rigid tabs or stops 28 which are used in the final product of the toy to prevent bending out of the temple bar ends which are to be inserted into cutouts 26.

Figure 2:
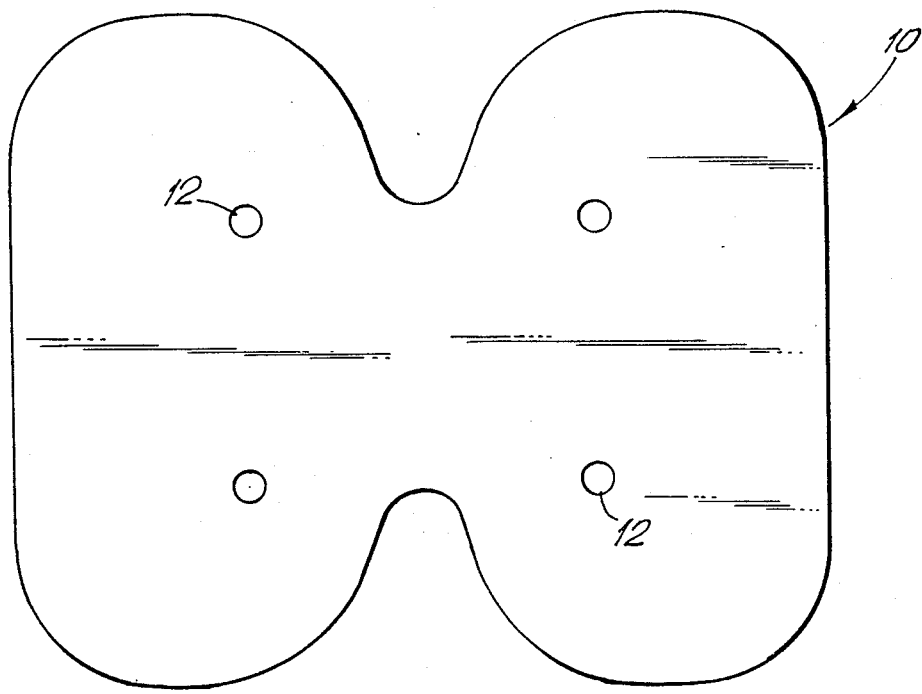
FIG. 2 is a reverse side of FIG. 1.

FIG. 2 illustrates the backside of blank 10 with through holes 12 provided therein.

Figure 3:
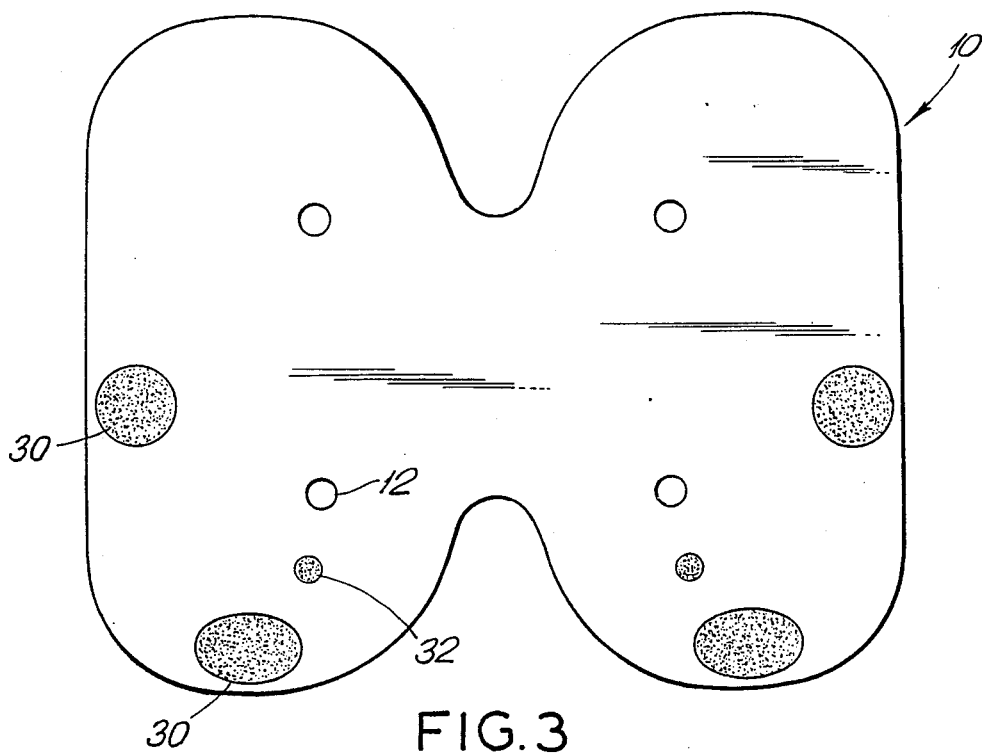
FIG. 3 is a reverse side of the eyeglasses similar to FIG. 2, with some glue placed thereupon.
Figure 4:
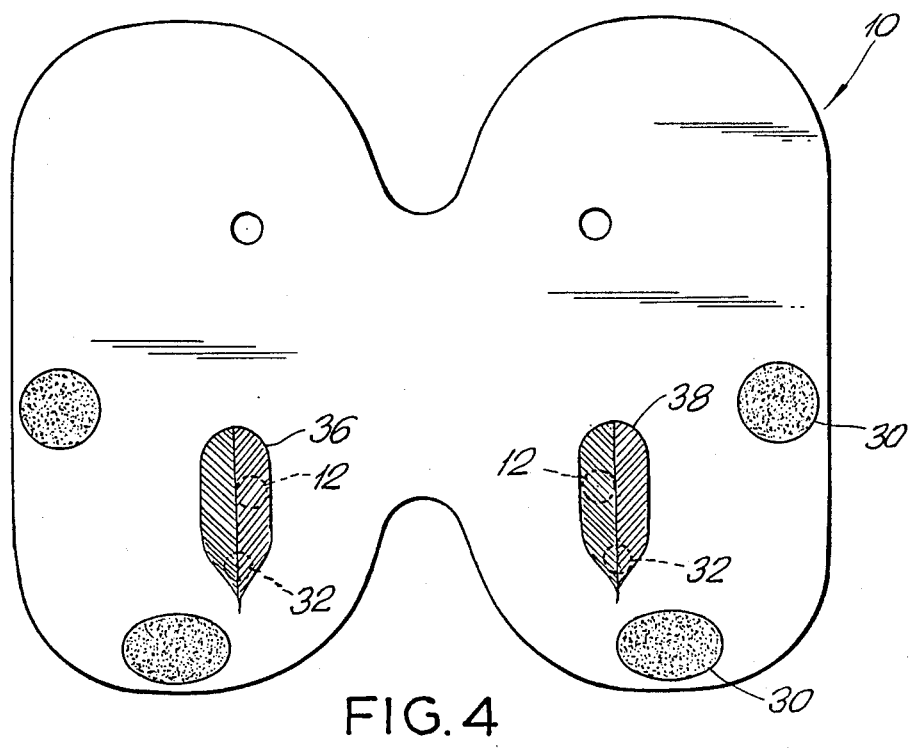
FIG. 4 illustrates the step of placing oriented feathers at the proper locations.

FIG. 3 is similar to FIG. 2 but shows a further step of the method of making eyeglasses according to the invention. In this step, glue 30, and 32 are applied to the backside of blank 10. The glue spots 32 are provided for a further step of attaching feathers as will be described in connection with FIG. 4 while larger glue spots 30 spaced from each other and distributed on the reverse side of the lower half of blank 10 are provided for glueing the two parts or halves of the blank together as will be explained in detail below.

Two feathers 36, 38 which are preferably Egret feathers are applied against respective holes 12 to form therewith lens members operating as the aforementioned light straining elements. Upon pressing feathers 36, 38 against the backside of the blank 10 the feathers are glued to the blank by glue 32. The orientation of the feather barbs or splines attached to the backside of blank 10 will be explained in detail hereinbelow.

Before feathers 36, 38 are glued to the backside of blank 10 the feathers are clarified by washing and treating them with a mild acid to remove opacity and provide a fine interlocking structure of feathers. The feathers can also be dyed so as to give them a slight tint.

Figure 5:
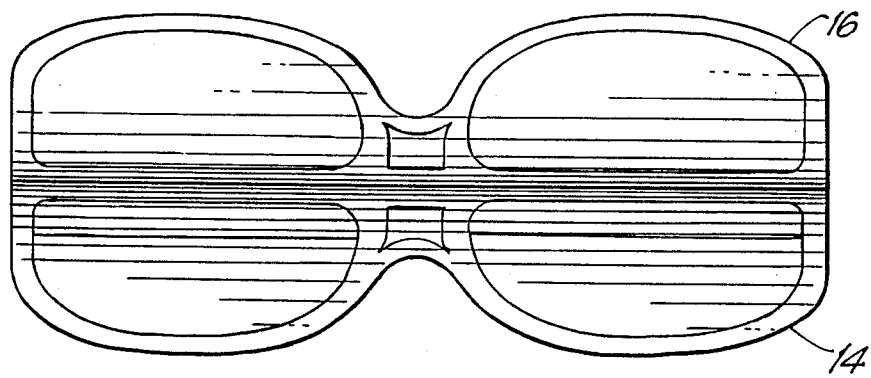
FIG. 5 illustrates the step of folding two interior faces together.

FIG. 5 shows a further step of folding two halves 14 and 16 of blank 10 together. When folded together the backsides of two halves 14 and 16 are glued to each other at glue spots 30 to form a frame 42 (FIGS. 8 and 9) of the eyeglasses.

FIG. 6 shows a temple bar 44 which is made, for example, of PVC and is compatible for heat-sealing to the PVC coated cardboard surface. Temple bar 44 is folded in the middle to form a stiffened construction and curved laterally to provide end portions 46, 48. Also, the temple bar 44 is bent at two ends 50, 52 of its central portion 54 to form living hinges. Moreover, hinges 50, 52 as well as all curves and bends on the temple bar 44 are made at the same time. Perforations can be made at ends 50, 52 of central portion 54 to facilitate folding or bending of the temple bar for the formation of the hinges.

The temple bar can be attached through a very simple process. Instead of using separate adhesive or fasteners, use can be made of the vinyl coating, for a different purpose from that which it was applied. Although applied as a protective layer, because of the vinyl coating, the temple bar can now be applied by simply applying heat. FIG. 7 illustrates the self-sealing of the temple bar 44 to the vinyl material-coated front surface of frame 42 by means of a heat sealer 56. Spot pressure applied to the temple bar is sufficient to seal the latter to frame 42 due to the fact that the vinyl material on the front surface of the frame is activated by heat and becomes adhesive.

The temple bar arms can be pivoted between an open position and a folded position. The stops 28 prevent outer bending of the temple bar arms.

FIGS. 8a, and 8b show a vertical orientation of feathers 36, 38. Central shafts 62, 64 of both feathers 36, 38 are in parallel with one another. However, in order to create an orthogonal effect when the lenses produced by these feathers are combined binocularly the left-hand barbs 66 covering one hole 12 on the front side of frame 42 (FIG. 8a) cross the right-hand barbs 68 which cover another hole 12 on the front side of frame 12 (FIG. 8b). In other words, barbs 66 and 68 extend at an angle to each other.

Figure 9A:
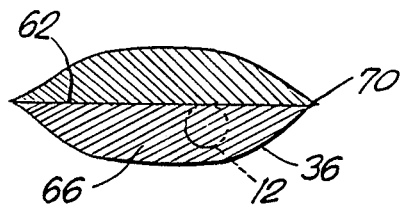
Figure 9B:
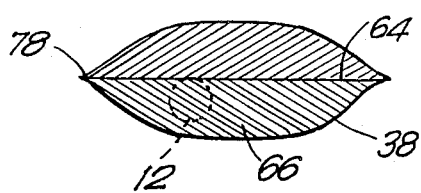

In the embodiment of FIGS. 9a and 9b feathers 36 and 38 are placed on the backside of blank 10 for frame 42 so that their central shafts 62, 64 extend horizontally and along the same axis. In this arrangement tips 70, 78 of feathers 36, 38 face each other while barbs 66 of the left-hand feather 36 extend to cross barbs 66 of the right-hand feather 38 so as to provide the same orthogonal effect when the eyeglasses are used.

Figure 10A:
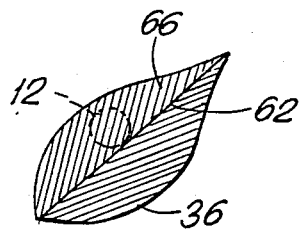
Figure 10B:
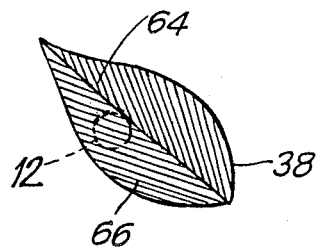

In the embodiments shown in FIGS. 10a and 10b, central shafts 62, 64 of feathers 36, 38 extend angularly to the central axes of holes 12. Barbs 66 of the left-hand feather 36 covering hole 12 to create the left-hand lens extend vertically while barbs 66 of the right-hand feather 38 over viewing hole 12 are horizontal. In this embodiment, similarly to those of Figs. 10a, 10b and 11a, 11b, when two lenses formed by feathers 36, 38 are combined binocularly they produce a continuous umbra following the shape of the object being viewed. In all the embodiments described the orientation of two feathers provides an overlapping effect for polarization. In this way a total umbra or shadow is formed around a object such as, a hand to be viewed through the lenses of the eyepieces.

There has been disclosed heretofore the best embodiment of the invention presently contemplated. However, it is to be understood that various changes and modifications may be made thereto without departing from the spirit of the invention.

What is claimed is:

1. An optical toy device, comprising:
    a frame for eyeglasses;
    a temple bar attached to said frame, said frame including two eyepieces each provided with a hole;
    and two transparent feathers attached to said frame to overlap the respective hole and form therewith an eyepiece lens;
    each feather having a central shaft and two sets of parallel barbs;

the barbs of the set of one feather overlapping one of the holes being angularly oriented with respect to the barbs of the set of another feather overlapping another of said holes, whereby when two eyepiece lenses of the eyeglasses are binocularly combined said feathers produce an effect resulting in a orthogonal simulated X-ray image of an object to be viewed.

2. An optical toy device as in claim 1, wherein said frame has a front surface and a back surface, each surface being coated with vinyl material.

3. An optical toy device as in claim 2, wherein said vinyl material is 9762 Pierce and Steven coating.

4. An optical toy device as in claim 1, wherein said feathers are positioned on said backside so that the central shafts thereof are vertical and in parallel with one another and both on the inside or outside with respect their respective holes.

5. An optical toy device as in claim 1, wherein said feathers are positioned on said backside so that the central shafts thereof are both horizontal and both are below their respective holes.

6. An optical toy device as in claim 1, wherein said feathers are positioned on said backside so that the central shafts thereof are inclined to an axis of the respective hole.

7. An optical toy device as in claim 1, wherein said temple bar has a central portion and two bent portions integral with and hingeably connected to said central portion, said central portion having at two opposing ends thereof perforations forming hinges between said central portion and said bent portions.

8. An optical toy device as in claim 1, wherein said frame is made of cardboard.

9. An optical toy device as in claim 8, wherein said temple bar is made of PVC and has thereon a PVC coating.

10. An optical toy device as in claim 1, wherein said temple bar is made of PVC.

11. A method of manufacturing an optical toy device, comprising the steps of:
   forming a blank for a frame for eyeglasses;
   coating the front side of said blank with vinyl coating;
   forming two pairs of mutually aligned holes in said blank;
   adhering to the backside of the blank two feathers each having a central shaft and two sets of parallel barbs so that the barbs of each feather overlap the respective hole in said blank to form therewith an eyepiece lens, while orienting said feathers such that the barbs of one set of the feather overlapping one of the holes are angularly oriented with the barbs of another set of the feather overlapping another of the holes, so as to produce eyepiece lenses capable of creating a simulated X-ray image of an object to be viewed;
   folding said blank at the backside thereof so that the lower part and a top part thereof are joined together and thereby forming the frame for eyeglasses having the eyepiece lenses;
   forming a temple bar; and
   heat-sealing said temple bar to said frame through the use of said vinyl coating.

12. A method as in claim 11, wherein said blank is formed of cardboard.

13. A method as in claim 12, wherein said temple bar is made of PVC.

14. A method as in claim 11, wherein spot pressure is applied to said temple bar in said heat-sealing step.

15. A method as in claim 11, wherein said temple bar is folded in the middle to increase stiffness thereof.

16. A method as in claim 11, and further comprising the step of making two spaced-apart perforations in said temple bar to form hingeable bent portions of said temple bar.

* * * * *